Patented Feb. 23, 1954

2,670,354

UNITED STATES PATENT OFFICE 2,670,354

4,6 - ALKYLIDENE-D-GLUCITOL AND PROCESS OF PRODUCING THE SAME FROM SUCROSE

Allen Scattergood, Orange, N. J., assignor to Sugar Research Foundation, Inc., Cambridge, Mass., a corporation of New York No Drawing. Application March 16, 1950, Serial No. 150,111

6 Claims. (Cl. 260—340.7)

The present invention relates to 4,6-alkylidene-D-glucitols and processes for their manufacture from sucrose.

The 4,6 - alkylidene - D - glucitols (sometimes called 4,6-alkylidene sorbitols), and particularly the 4,6-ethylidene-D-glucitol, are believed to be entirely new materials never before prepared.

While alkylidene-D-glucopyranoses have been described in literature they have never been produced by anhydrous methods as herein more fully disclosed.

It is therefore a further object of the invention to produce first 4,6-alkylidene-D-glucopyranoses followed by their reduction or hydrogenation to yield the corresponding glucitols.

Broadly speaking, the present invention involves reacting sucrose with an alkyl aldehyde under anhydrous conditions in the presence of catalytic amounts of sulfuric acid. Thus by starting with a polymer of acetaldehyde such as paraldehyde and commercial sucrose, it is possible to produce 4,6-ethylidene-D-glucopyranose. By using the higher aldehydes or more particularly the polymers of acetaldehyde and aldehydes having from 3 to 4 carbon atoms, it is possible to produce for example 4,6-propylidene-D-glucopyranose and the corresponding 4,6-butylidene-D-glucopyranose and from this the corresponding glucitols.

As an example of one operative method of carrying out the method of the present invention, I will describe the production of 4,6-ethylidene-D-glucitol. Thus 1 mole (342 grams) of granulated sucrose (cane or beet sugar) is shaken with 2 moles of paraldehyde plus 2 cubic centimeters of concentrated sulfuric acid, this being done at room temperature for a period of from 24 to 72 hours. The amount of sulfuric acid used may vary from 0.5 centimeter to 5.0 centimeters. In place of one mole of the paraldehyde, 1 mole of dioxane can be used, the same product being obtained in either case.

At the end of the reaction time 500 cubic centimeters of ethyl acetate are added and the mixture is shaken until a homogeneous solution results. The resulting solution is then refrigerated for several hours to a temperature of about 35° to 40° F., whereupon the crystalline 4,6-ethylidene-D-glucopyranose separates out.

This is then filtered off on a Buchner funnel and washed therein several times with ethyl acetate, and finally with ether. Any residual acid therein is removed by careful washing. The crude yield obtained was from about 30% to 60% by weight based upon the glucose content of the sucrose.

The crude ethylidene glucose thus obtained was recrystallized from 3 to 7 times its weight of absolute alcohol. As soon as the crude product had been suspended in hot absolute alcohol, the suspension was brought to the neutral point pH of 7 by the addition of a few drops of strong ammonium hydroxide. If desired the solution in alcohol can be clarified by the use of an absorbent clay from which it is filtered while hot. When the alcohol cools, crystals of relatively pure 4,6-ethylidene glucose are formed.

In this particular example the second crystallization from alcohol yielded a substance melting at 174–176° C., uncorrected.

The substance thus obtained was converted into the 4,6-ethylidene-D-glucitol in the following manner:

36 grams of the twice crystallized ethylidene glucose was dissolved in 150 cc. of distilled water containing 0.4 cubic centimeter of concentrated ammonium hydroxide. Thereafter 1 gram of Raney nickel catalyst was added and the solution shaken under a hydrogen pressure of from 1000 to 1500 pounds per square inch for five hours at a temperature of 100° C. At the end of this time the solution was found to be nonreducing to Fehling's solution, showing the conversion to glucitol had been substantially complete.

The solution was filtered from any insoluble material and then concentrated in a vacuum to a syrupy consistency and then mixed with an equal volume of isobutanol and allowed to stand overnight under refrigerated conditions. This yielded a crop of crystals which were filtered off, washed with ether and after drying in a vacuum were found to have a melting point of from 90–100° C.

By starting with the corresponding higher aldehyde and producing in substantially the same manner, the propylidene and butylidene-D-glucitols can be prepared.

One of the advantages of the present invention is that it is possible thereby to produce 4,6-ethylidene-D-glucitol which may serve as further intermediates for the production of other compounds, particularly because the 4,6-carbon OH positions are thus tied up, enabling a simpler derivativization of the remaining four hydroxyl positions.

What is claimed is:
1. 4,6-alkylidene-D-glucitols.
2. 4,6-ethylidene-D-glucitol.
3. 4,6-propylidene-D-glucitol.
4. 4,6-butylidene-D-glucitol.
5. A process of producing alkylidene-D-glucitols which comprises treating sucrose with an alkyl aldehyde under substantially anhydrous conditions in the presence of catalytic amounts of sulfuric acid to produce a 4,6-alkylidene-D-glucopyranose, separating the latter and reducing the same to the corresponding glucitol.

6. Process of producing 4,6-ethylidene-D-glucitol from sucrose which comprises treating sucrose with paraldehyde under substantially anhydrous conditions in the presence of catalytic amounts of sulfuric acid to produce 4,6-ethylidene-D-glucopyranose and reducing the latter to 4,6-ethylidene-D-glucitol.

ALLEN SCATTERGOOD.

References Cited in the file of this patent

UNITED STATES PATENTS

| Number | Name | Date |
| --- | --- | --- |
| 1,963,999 | Larchar | June 26, 1934 |
| 1,990,245 | Mueller | Feb. 5, 1935 |
| 2,292,293 | Rose | Aug. 4, 1942 |

OTHER REFERENCES

Sutra, Bull. Soc. Chim. 9, 794–5 (1942).
J. Am. Chem. Soc. 65, 751 (1943).